(12) United States Patent
Sahlin et al.

(10) Patent No.: US 10,499,435 B2
(45) Date of Patent: Dec. 3, 2019

(54) CONFIGURATION OF BEAMFORMING MODE

(71) Applicant: Telefonaktiebolaget LM Ericsson (publ), Stockholm (SE)

(72) Inventors: Henrik Sahlin, Mölnlycke (SE); Icaro L. J. Da Silva, Bromma (SE); Asbjörn Grövlen, Stockholm (SE); Andres Reial, Malmö (SE); Johan Rune, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 158 days.

(21) Appl. No.: 15/510,957

(22) PCT Filed: Jan. 5, 2017

(86) PCT No.: PCT/EP2017/050188
§ 371 (c)(1),
(2) Date: Mar. 13, 2017

(87) PCT Pub. No.: WO2018/127283
PCT Pub. Date: Jul. 12, 2018

(65) Prior Publication Data
US 2018/0343679 A1    Nov. 29, 2018

(51) Int. Cl.
*H04W 4/00* (2018.01)
*H04W 74/08* (2009.01)
(Continued)

(52) U.S. Cl.
CPC ...... *H04W 74/0833* (2013.01); *H04B 7/0617* (2013.01); *H04W 16/28* (2013.01);
(Continued)

(58) Field of Classification Search
CPC .......... H04B 7/0617; H04B 7/04; H04B 7/06; H04W 24/02; H04W 16/18; H04W 28/08; H04W 52/40
See application file for complete search history.

(56) References Cited

U.S. PATENT DOCUMENTS 8,923,218 B2 * 12/2014 Luo ...................... H04B 7/0413
370/329
9,942,886 B1 * 4/2018 John Wilson ..... H04W 72/0453
(Continued)

FOREIGN PATENT DOCUMENTS

| KR | 20140009046 A | 1/2014 |
|---|---|---|
| WO | 2011053993 A1 | 5/2011 |
| WO | 2016086144 A1 | 6/2016 |

OTHER PUBLICATIONS

Kim et al, Mode Selection Between Antenna Grouping and Beamforming for MIMO Communication Systems, IEEE, 6 pages, 2009.*
(Continued)

*Primary Examiner* — Frank Duong
(74) *Attorney, Agent, or Firm* — Rothwell, Figg, Ernst & Manbeck, P.C.

(57) ABSTRACT

There is provided mechanisms for configuring beamforming mode during a network access procedure of a second radio transceiver device. A method is performed by a first radio transceiver device. The method comprises transmitting a message indicating which beamforming mode from at least two available beamforming modes the second radio transceiver device is to use when transmitting a network access signal.

28 Claims, 4 Drawing Sheets

(51) Int. Cl.
*H04B 7/06* (2006.01)
*H04W 16/28* (2009.01)
*H04W 48/10* (2009.01)
*H04W 74/00* (2009.01)

(52) U.S. Cl.
CPC ......... *H04W 48/10* (2013.01); *H04W 74/004* (2013.01); *H04W 74/0866* (2013.01)

(56) References Cited

U.S. PATENT DOCUMENTS

| | | | |
|---|---|---|---|
| 9,949,289 B2* | 4/2018 | Song | H04L 1/00 |
| 10,064,069 B2* | 8/2018 | Park | H04W 16/28 |
| 2016/0192401 A1 | 6/2016 | Park et al. | |
| 2017/0251460 A1* | 8/2017 | Agiwal | H04W 72/0406 |
| 2017/0303265 A1* | 10/2017 | Islam | H04B 7/0639 |
| 2017/0331670 A1* | 11/2017 | Parkvall | H04W 52/0274 |
| 2018/0027594 A1* | 1/2018 | Nagaraja | H04B 7/0695 370/329 |
| 2018/0034515 A1* | 2/2018 | Guo | H04B 7/043 |
| 2018/0048442 A1* | 2/2018 | Sang | H04B 17/318 |
| 2019/0013857 A1* | 1/2019 | Zhang | H04B 7/0695 |
| 2019/0104549 A1* | 4/2019 | Deng | H04B 7/0617 |

OTHER PUBLICATIONS

International Search Report and Written Opinion issued in International Application No. PCT/EP2017/050188, dated Sep. 21, 2017, 14 pages.

* cited by examiner

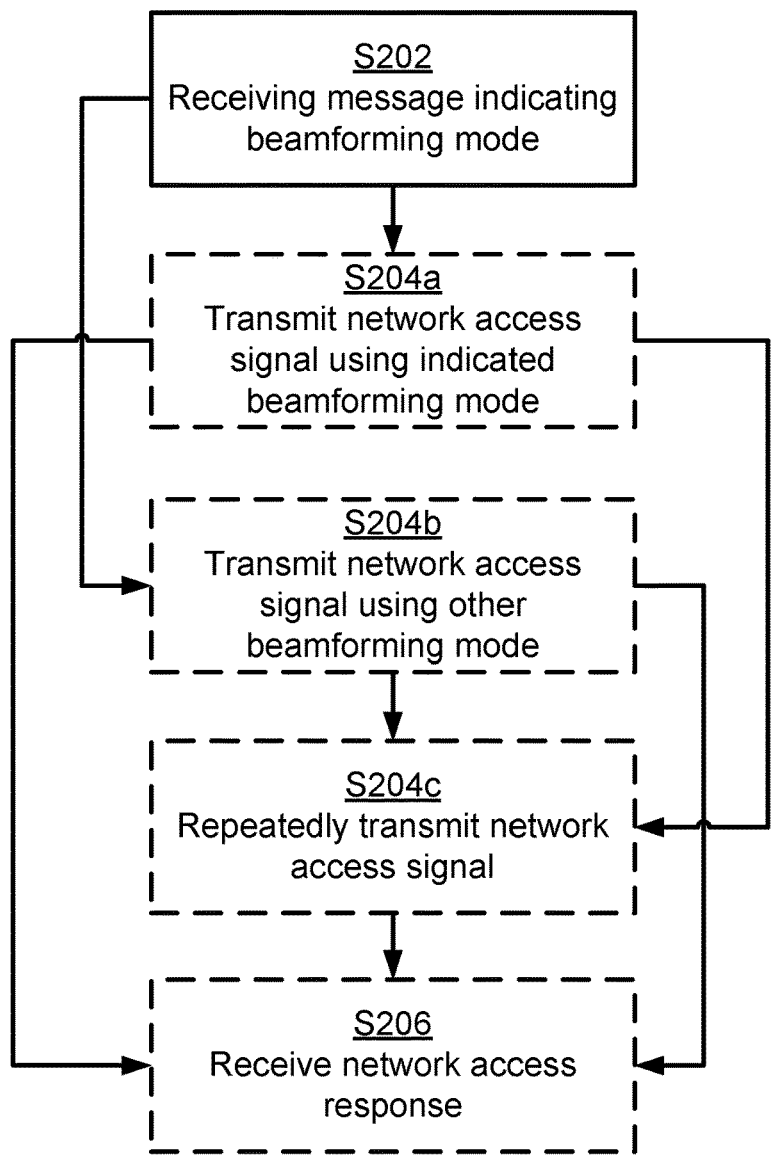

CONFIGURATION OF BEAMFORMING MODE

CROSS REFERENCE TO RELATED APPLICATION(S)

This application is a 35 U.S.C. § 371 National Stage of International Patent Application No. PCT/EP2017/050188, filed Jan. 5, 2017, designating the United States, the disclosure of which is incorporated by reference.

TECHNICAL FIELD

Embodiments presented herein relate to methods, radio transceiver devices, computer programs, and a computer program product for configuring beamforming mode during a network access procedure of a radio transceiver device.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to provide efficient network access for wireless devices served by the communications network.

FIG. 1 is a signalling diagram of part of a Long Term Evolution (LTE) random access procedure between a radio transceiver device 300 (e.g., a wireless device) and two other radio transceiver devices 200a, 200b (e.g., radio access network nodes such as gNB (next Generation NodeB) or TRP (Transmission and Reception Point). The radio transceiver devices 200a, 200b transmit synchronization signals (SS), such as PSS (Primary synchronization signal), SSS (Secondary synchronization signal), NR-PSS (New radio primary synchronization signal), NR-SSS (New radio secondary synchronization signal), enabling the radio transceiver device 300 to perform synchronization, step S301. The radio transceiver devices 200a, 200b transmits system information, such as configuration parameters, on a broadcast channel PBCH (Physical Broadcast Channel), NR-PBCH (New Radio Physical Broadcast Channel), possibly complemented by configuration parameters received on yet another channel, step S302. The radio transceiver device 300 that would like to access the network initiates the random access procedure by transmitting a random access preamble (Msg1) in the uplink on the Physical Random Access Channel (PRACH), step S303. FIG. 1 it s assumed that both radio transceiver devices 200a, 200b receives the random access preamble on the PRACH. A radio transceiver device 200a, 200b receiving the preamble and detecting the random-access attempt will respond in the downlink by transmitting a random access response (RAR; Msg2), steps S304a, S304b. It here assumed that the radio transceiver device 300 receives the RAR only from radio transceiver device 200a, and hence not from radio transceiver device 200b. The RAR carries an uplink scheduling grant for the radio transceiver device 300 to continue the procedure by transmitting a following subsequent message in the uplink (Msg3) for terminal identification to the radio transceiver device 200a from which it received the RAR, step S305.

A PRACH resource is defined which is common for several SS (NR-PSS and NR-SSS) as described in "NR random access procedure", R1-1609670, 3GPP TSG-RAN WG1 #86bis, Lisbon, Portugal, Sep. 10-14, 2016. This flexible timing indication of the PRACH resource has lower resource overhead compared to using a fixed timing. The timing from SS to the PRACH resource can be indicated in a master Information Block (MIB). Alternatively, this timing is conceivably in the SS itself or another related field, if another system information format should be agreed. Different SS can then be used for different timings such that the detected sequence within SS gives the PRACH resource. This PRACH configuration might be specified as a timing relative to the transmission of the SS and the transmission of the PBCH, and can be given as a combination of the payload in the MIB and other broadcasted system information. However, this does not resolve the situation outlined above where the radio transceiver device 300 does not receive the RAR from the radio transceiver device 200b.

However, there is still a need for an improved random access procedure.

SUMMARY

An object of embodiments herein is to provide efficient network access for radio transceiver devices in a communications network.

According to a first aspect there is presented a method for configuring beamforming mode during a network access procedure of a second radio transceiver device. The method is performed by a first radio transceiver device. The method comprises transmitting a message indicating which beamforming mode from at least two available beamforming modes the second radio transceiver device is to use when transmitting a network access signal.

According to a second aspect there is presented a radio transceiver device acting as a first radio transceiver device for configuring beamforming mode during a network access procedure of a second radio transceiver device. The radio transceiver device comprises processing circuitry. The processing circuitry is configured to cause the radio transceiver device to transmit a message indicating which beamforming mode from at least two available beamforming modes the second radio transceiver device is to use when transmitting a network access signal.

According to a third aspect there is presented a radio transceiver device acting as a first radio transceiver device for configuring beamforming mode during a network access procedure of a second radio transceiver device. The radio transceiver device comprises processing circuitry and a storage medium. The storage medium stores instructions that, when executed by the processing circuitry, cause the radio transceiver device to transmit a message indicating which beamforming mode from at least two available beamforming modes the second radio transceiver device is to use when transmitting a network access signal.

According to a fourth aspect there is presented a radio transceiver device acting as a first radio transceiver device for configuring beamforming mode during a network access procedure of a second radio transceiver device. The radio transceiver device comprises a transmit module configured to transmit a message indicating which beamforming mode from at least two available beamforming modes the second radio transceiver device is to use when transmitting a network access signal.

According to a fifth aspect there is presented a computer program for configuring beamforming mode during a network access procedure of a second radio transceiver device, the computer program comprises computer program code which, when run on processing circuitry of a radio transceiver device acting as a first radio transceiver device, causes the radio transceiver device to perform a method according to the first aspect.

According to a sixth aspect there is presented a method for configuring beamforming mode during a network access procedure of a second radio transceiver device. The method is performed by the second radio transceiver device. The method comprises receiving, from a first radio transceiver device, a message indicating which beamforming mode from at least two available beamforming modes the second radio transceiver device is to use when transmitting a network access signal.

According to a seventh aspect there is presented a radio transceiver device acting as a second radio transceiver device for configuring beamforming mode during a network access procedure of the radio transceiver device. The radio transceiver device comprises processing circuitry. The processing circuitry is configured to cause the radio transceiver device to receive, from a first radio transceiver device, a message indicating which beamforming mode from at least two available beamforming modes the radio transceiver device is to use when transmitting a network access signal.

According to an eighth aspect there is presented a radio transceiver device acting as a second radio transceiver device for configuring beamforming mode during a network access procedure of the radio transceiver device. The radio transceiver device comprises processing circuitry and a storage medium. The storage medium stores instructions that, when executed by the processing circuitry, cause the radio transceiver device to receive, from a first radio transceiver device, a message indicating which beamforming mode from at least two available beamforming modes the radio transceiver device is to use when transmitting a network access signal.

According to a ninth aspect there is presented a radio transceiver device acting as a second radio transceiver device for configuring beamforming mode during a network access procedure of the radio transceiver device. The radio transceiver device comprises a receive module configured to receive, from a first radio transceiver device, a message indicating which beamforming mode from at least two available beamforming modes the radio transceiver device is to use when transmitting a network access signal.

According to a tenth aspect there is presented a computer program for configuring beamforming mode during a network access procedure of a second radio transceiver device, the computer program comprising computer program code which, when run on processing circuitry of a radio transceiver device acting as the second radio transceiver device, causes the radio transceiver device to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these radio transceiver devices, and these computer programs provide an efficient random access procedure which can enable efficient network access for the second radio transceiver device in a communications network.

Advantageously these methods, these radio transceiver devices, and these computer programs enable the use of so-called silent nodes (also called hidden nodes) for detection of network access signals.

Advantageously these methods, these radio transceiver devices, and these computer programs improve detection performance of network access signals in heterogeneous networks.

Advantageously these methods, these radio transceiver devices, and these computer programs limit unnecessary interference caused by unnecessary transmissions of network access signals in scenarios not having any hidden nodes or low power nodes (in a heterogeneous network) to benefit from since the transmission power of the network access signals can be directed towards appropriate receivers, while the radiated power is limited in other directions where it would otherwise cause unnecessary interference.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 3, 4, 5, and 6 are flowcharts of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 2:
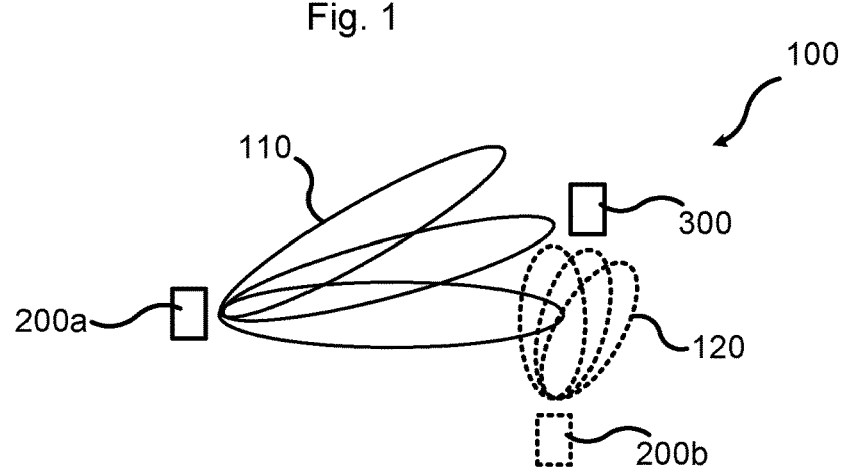
FIG. 2 is a schematic diagram illustrating a communication network according to embodiments.

FIG. 2 is a schematic diagram illustrating a communications network 100 where embodiments presented herein can be applied.

The communications network 100 comprises at least one first radio transceiver device 200a, 200b operating as a radio access network node, radio base station, base transceiver station, node B, evolved node B, access point, access node, gNB or TRP. Each first radio transceiver device 200a, 200b transmits signals in beams 110, 120.

The communications network 100 comprises a second radio transceiver device 300 operating as a wireless device, mobile station, mobile phone, handset, wireless local loop phone, user equipment (UE), smartphone, laptop computer, tablet computer, wireless modem, wireless sensor device, or wireless backhaul node.

It is assumed that the second radio transceiver device 300 wishes to communicate with one of the first radio transceiver device 200a, 200b, for example to access services and/or exchange data, and therefore performs a network access procedure. The network access procedure for example involves the second radio transceiver device 300 to transmit network access signals to be received by at least one of the first radio transceiver devices 200a, 200b. In this respect, the term network access procedure should be interpreted broadly; it could be used during initial access or during handover; it could be used during a state transition of the second radio transceiver device 300 from any of idle mode, inactive mode, flight mode, and dormant mode to any of active mode, and connected mode.

Figure 1:
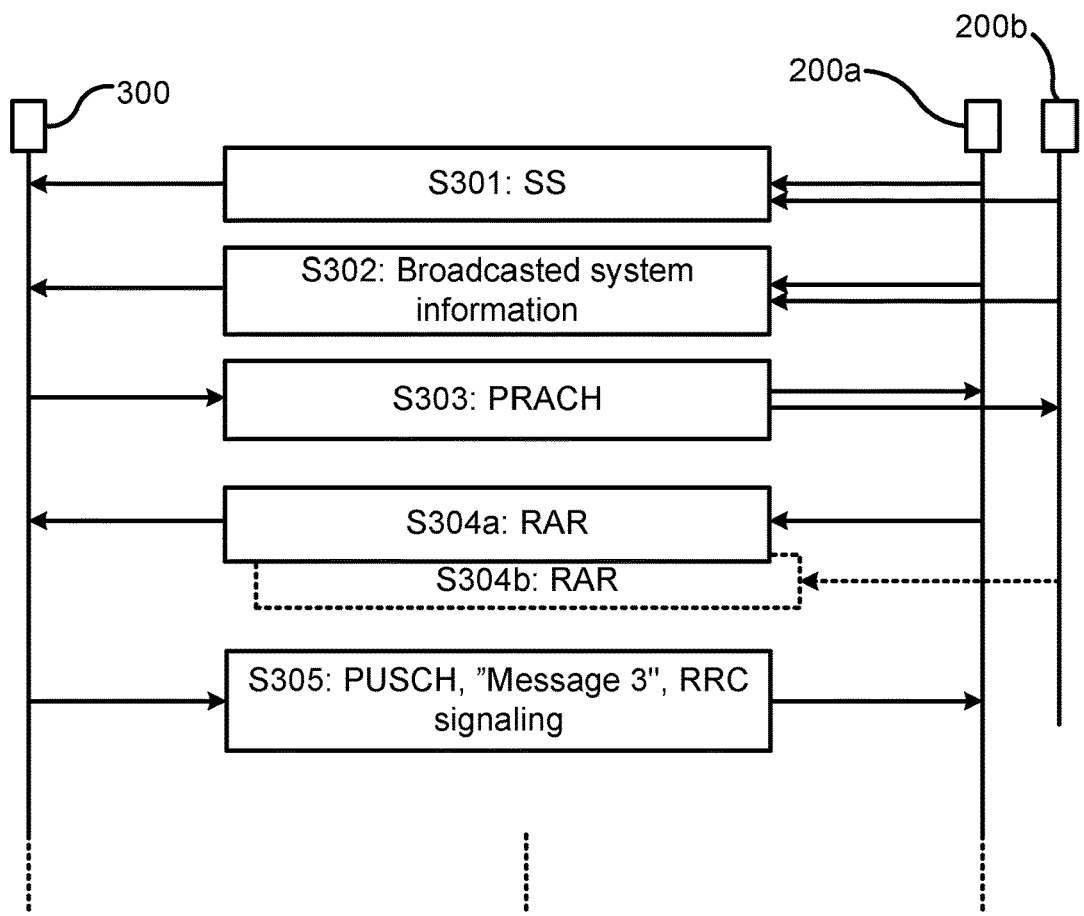
FIG. 1 is a schematic illustration of a random access procedure according to state of the art.

Some first radio transceiver devices 200a, 200b in the network 100 might not transmit synchronization and broadcast signals in order to save energy and reduce interference. In the illustrative example of FIG. 1, the first radio transceiver device 200b in some aspects does not transmit synchronization or broadcast signals. This does not exclude that such a first radio transceiver device 200b is used for communication with the second radio transceiver device 300, e.g. after a handover or as a result of a random access request from an idle or inactive second radio transceiver device 300, in some cases provided that the configuration of the first radio transceiver device 200b for receiving network access signals is aligned with the configuration for transmission of the network access signals as announced in the system information broadcast/transmitted (by the first radio transceiver device 200a) in the coverage area of the first radio transceiver devices 200a, 200b. Here the term "inactive" generally refers to a state where the first radio transceiver devices 200a, 200b are operating as radio access network nodes, where the second radio transceiver device 300 is a wireless device, and the state information (i.e. context) of the wireless device remains in the radio access network node serving the wireless device and the connection between this radio access network node and the core network pertaining to that wireless device (e.g. the connection over interface S1) is also kept, whereas the behavior of the wireless device will be more similar to that of a radio resource control idle state than that of a radio resource control connected state.

This reduction in transmitted signals might be done temporarily during low traffic hours or as a static configuration. The first radio transceiver device 200b is sometimes referred to as a "silent node". As soon as the communications network 100 is aware of presence of the second radio transceiver device 300, the thus far hidden first radio transceiver device 200b might be activated for receiving and transmitting. The first radio transceiver device 200b might also be actively receiving the random access preamble during time and frequency intervals as configured by another first radio transceiver device 200a in the communications network 100. As soon as the thus far hidden first radio transceiver device 200b detects a random access preamble it can be activated and transmit a RAR. This can be beneficial if the thus far hidden first radio transceiver device 200b has a better link budget to the second radio transceiver device 300 than other first radio transceiver devices or if other first radio transceiver device experience higher load.

When several first radio transceiver devices 200a, 200b, located in the same area, possibly with fully or partly overlapping coverage areas, have different transmit powers, the communications network 100 could be referred to as a heterogeneous network. In the illustrative example of FIG. 1, the first radio transceiver device 200b in some aspects is assumed to have lower transmit power than the first radio transceiver device 200a. Several first radio transceiver devices 200a, 200b in a heterogeneous network might transmit the same SS in an SFN (Single Frequency Network) fashion. SFN transmission is not limited to heterogeneous networks. This is transparent for the second radio transceiver device 300 in the sense that the second radio transceiver device 300 is unaware of that several first radio transceiver devices 200a, 200b are included in these transmissions.

The second radio transceiver device 300 might transmit random access preambles in relation to received SS power and in the direction in which it receives SS. In a heterogeneous network the second radio transceiver device 300 might receive a stronger signal from a high power first radio transceiver device 200a than from a low power first radio transceiver device 200b, while the low power first radio transceiver device 200b has a better link budget in uplink (is closer) than the high power first radio transceiver device 200a.

For hidden nodes and within heterogeneous networks, the second radio transceiver device 300 might transmit the random access preamble with a transmit power and with a beamforming in a direction such that it is not detected at the first radio transceiver device with best uplink link budget to the second radio transceiver device 300. Thereby the second radio transceiver device 300 and the communications network 100 as a whole misses the opportunity to utilize the first radio transceiver device that would have provided the most efficient conditions for communication. This issue is present whether or not SFN transmission of the SS is used.

Figure 3:
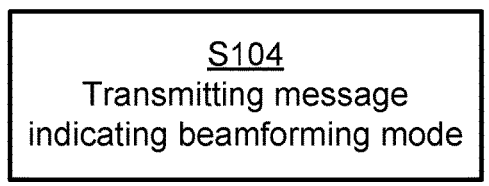
Figure 4:
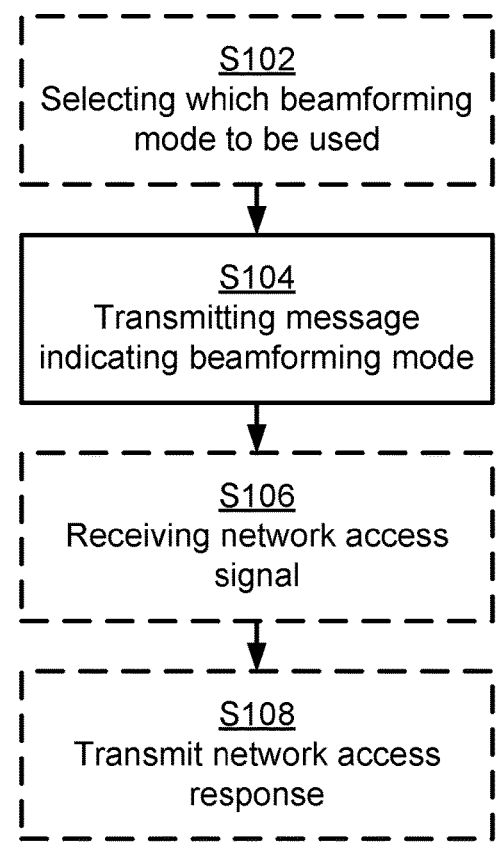

FIGS. 3 and 4 are flow charts illustrating embodiments of methods for configuring beamforming mode during a network access procedure of the second radio transceiver device 300 as performed by the first radio transceiver device 200a. FIGS. 5 and 6 are flow charts illustrating embodiments of methods for configuring beamforming mode during a network access procedure of the second radio transceiver device 300 as performed by the second radio transceiver device 300. The methods are advantageously provided as computer programs 1120a, 1120b.

Reference is now made to FIG. 3 illustrating a method for configuring beamforming mode during a network access procedure of the second radio transceiver device 300 as performed by the first radio transceiver device 200a according to an embodiment.

S104: The first radio transceiver device 200a transmits a message indicating which beamforming mode from at least two available beamforming modes the second radio transceiver device 300 is to use when transmitting a network access signal.

As disclosed above, the network access procedure could be used during initial access or during handover of the second radio transceiver device 300; it could be used during a state transition of the second radio transceiver device 300 from any of idle mode, inactive mode, flight mode, and dormant mode to any of active mode, and connected mode.

Embodiments relating to further details of configuring beamforming mode during a network access procedure of the second radio transceiver device 300 as performed by the first radio transceiver device 200a will now be disclosed.

There could be different examples of network access signals. According to an embodiment the network access signal is a random access preamble for a Physical Random Access Channel (PRACH).

Reference is now made to FIG. 4 illustrating methods for configuring beamforming mode during a network access procedure of the second radio transceiver device 300 as performed by the first radio transceiver device 200a according to further embodiments. It is assumed that step S104 is performed as described above with reference to FIG. 3 and a thus repeated description thereof is therefore omitted.

There may be different ways for the first radio transceiver device 200a to determine which of the at least two available beamforming modes to be indicated to the second radio transceiver device 300 in step S104. According to some aspects the selection of beamforming mode dependent on the architecture and/or topology of the communications network 100 of which the first radio transceiver device 200a is part. Hence, according to an embodiment the first radio transceiver device 200a is part of a communications network 100 and the first radio transceiver device 200a is configured to perform step S102:

S102: The first radio transceiver device 200a selects which one of the at least two available beamforming modes to be indicated to the second radio transceiver device 300 based on at least one of architecture and topology of the communications network 100.

In this respect, the architecture and/or topology of the communications network 100 could specify whether or not there are any first radio transceiver device 200b acting as a hidden node in the communications network 100, whether or not the communications network 100 is based on SFN, beamforming capability of the first radio transceiver devices 200a, 200b and the physical deployment (including, but not limited to, physical locations) of the first radio transceiver devices 200a, 200b in the communications network 100.

As will be further disclosed below, the message transmitted by the first radio transceiver device 200a in step S104 is received by the second radio transceiver device 300, whereby the second radio transceiver device 300 responds to the message by transmitting a network access signal. In some aspects this network access signal is received by the first radio transceiver device 200a. Hence, according to an embodiment the first radio transceiver device 200a is configured to perform step S106:

S106: The first radio transceiver device 200a receives the network access signal in the indicated beamforming mode from the second radio transceiver device 300.

In other aspects this network access signal is received by another first radio transceiver device 200b. The first radio transceiver device receiving the network access signal responds to the network access signal by transmitting a network access response in order for the network access procedure of the second radio transceiver device 300 to continue. Hence, according to an embodiment the first radio transceiver device 200a is configured to perform step S108:

S108: The first radio transceiver device 200a transmits a network access response to the second radio transceiver device 300 in response to having received the network access signal in step S106.

There could be different examples of network access responses. According to an embodiment the network access response is a Random Access Response (RAR).

Further embodiments relating to the first radio transceiver device 200a will be disclosed below.

Reference is now made to FIG. 5 illustrating a method for configuring beamforming mode during a network access procedure of the second radio transceiver device 300 as performed by the second radio transceiver device 300 according to an embodiment.

As disclosed above, the first radio transceiver device 200a in step S104 transmits a message to the second radio transceiver device 300 indicating beamforming mode. It is assumed that the second radio transceiver device 300 receives this message and hence is configured to perform step S202:

S202: The second radio transceiver device 300 receives, from the first radio transceiver device 200a, a message indicating which beamforming mode from at least two available beamforming modes the second radio transceiver device 300 is to use when transmitting a network access signal.

Embodiments relating to further details of configuring beamforming mode during a network access procedure of the second radio transceiver device 300 as performed by the second radio transceiver device 300 will now be disclosed.

As disclosed above, the network access signal could be a random access preamble.

Reference is now made to FIG. 6 illustrating methods for configuring beamforming mode during a network access procedure of the second radio transceiver device 300 as performed by the second radio transceiver device 300 according to further embodiments. It is assumed that step S202 is performed as described above with reference to FIG. 5 and a thus repeated description thereof is therefore omitted.

There may be different ways for the second radio transceiver device 300 to act once having received the message in step S102.

In some aspects the second radio transceiver device 300 transmits the network access signal. Hence, according to an embodiment the second radio transceiver device 300 is configured to perform step S204a:

S204a: The second radio transceiver device 300 transmits the network access signal using the indicated beamforming mode. The network access signal could be transmitted either to the first radio transceiver device 200a or to another first radio transceiver device 200b (e.g., when the network access procedure relates to handover of the second radio transceiver device 300 from the first radio transceiver device 200a to said another first radio transceiver device 200b, or when SFN transmission from multiple first radio transceiver devices 200a, 200b acting as TRPs is used).

Alternatives of how the second radio transceiver device 300 could transmit the network access signal when it is not able to use the indicated beamforming mode will be disclosed below.

As disclosed above, the first radio transceiver device 200a, 200b receiving the network access signal responds to the network access signal with a network access response. Hence, according to an embodiment the second radio transceiver device 300 is configured to perform step S206:

S206: The second radio transceiver device 300 receives a network access response from any radio transceiver device receiving the network access signal. This any radio transceiver device could either be the first radio transceiver device 200a or another first radio transceiver device 200b, for example if SFN transmission from multiple first radio transceiver devices 200a, 200b acting as TRPs is used.

There could be different ways for the second radio transceiver device 300 to act if it does not receive any response to the network access signal as transmitted in step S202.

In some aspects, the second radio transceiver device 300 performs a modified re-transmission of the network access signal if a response to the network access signal as transmitted in step S202 is not received. Hence, according to an embodiment the second radio transceiver device 300 is configured to perform step S204c in absence of reception of a network access response to the transmitted network access signal:

S204c: The second radio transceiver device 300 repeatedly transmits the network access signal using at least one of increased beam width, modified spatial beam direction, and increased transmission power compared to the indicated beamforming mode.

Two specific examples of how to repeatedly transmit the network access signal in step S204c will be disclosed next.

In a case the indicated beamforming mode is for the second radio transceiver device 300 to use a maximum beam width, the repeated network access signal could in step S204c transmitted using increased transmission power and using the maximum beam width.

In a case the indicated beamforming mode is for the second radio transceiver device 300 to use a beam width narrower than the maximum beam width, the repeated network access signal could in step S204c be transmitted using increased beam width.

As disclosed above the first radio transceiver device 200a is configured to indicate which beamforming mode from at least two available beamforming modes the second radio transceiver device 300 is to use when transmitting a network access signal. Examples of such beamforming modes will now be disclosed.

In some aspects, each beamforming mode indicates a maximum or minimum beam width. Thus, according to embodiments each of the at least two available beamforming modes is associated with either a maximum beam width or a minimum beam width to be used for the transmission of the network access signal.

Further, according to some aspects, each mode specifies combination of beam width and power. Thus, according to embodiments each of the at least two available beamforming modes is associated with a unique combination of beam width and beam power to be used for the transmission of the network access signal.

Three non-limiting examples of beamforming modes will now be disclosed. However, as the skilled person these are just examples and other beamforming modes are also possible.

Mode 0

According to a first beamforming mode (hereinafter denoted "Mode 0") the second radio transceiver device 300 is indicated to transmit the network access signal using as wide beam or as omnidirectional beam as possible, regardless of the received SS direction.

If a wide beam with a power distribution that deviates from omnidirectional transmission is used, then the second radio transceiver device 300 may direct the wide beam such that direction in which it has its transmit power maximum is the opposite of the direction from which the second radio transceiver device 300 received the strongest (i.e. highest power) SS.

Mode 0 could be useful when the direction from the received SS block is not the same as potential useful directions for transmitting the network access signal. An example is hidden nodes that did not send any SS block but still try to detect network access signals. Another example is a heterogeneous network with SFN transmissions of the SS blocks.

Mode 1

According to a second beamforming mode (hereinafter denoted "Mode 1") the second radio transceiver device 300 is indicated to transmit the network access signal using reciprocity beamforming based on the received SS. That is, according to an embodiment one of the at least two available beamforming modes indicates the second radio transceiver device 300 to use reciprocity beamforming in relation to received reference signals or in relation to the received message indicating the beamforming mode. In a heterogeneous network with SFN transmissions the reference signals could be received from either the first radio transceiver device 200a or another first radio transceiver device 200b.

If the second radio transceiver device 300 only can transmit using fixed beams (i.e. it can only transmit in one beam at a time and cannot freely direct the beam in any direction and width, but has to choose from a set of preconfigured directions and widths), then it may use as narrow beamforming as possible (if it is capable of reciprocity transmission) and select the one of its fixed beam configurations that best matches the direction in which it detects most energy in the downlink SS transmission. This is most useful if only one first radio transceiver device 200a sends an SS block via a line of sight (LoS) or other dominant propagation path towards the second radio transceiver device 300. Even if the SS is transmitted from multiple sources or if multiple propagation paths are present, the use of Mode 1 ensures that the energy of the network access signal is directed in a relevant direction (i.e., towards the first radio transceiver device 200a).

The second radio transceiver device 300 may perform matching of the radio propagation channel of the received SS block such that it estimates transmitter beamforming based on the received SFN signal. In this way the second radio transceiver device 300 could transmit the network access signal proportionally in the SFN source directions. This approach also maximizes performance if a single first radio transceiver device 200a transmits the SS via a spatially rich channel (i.e. in scenarios with multipath propagation).

A second radio transceiver device 300 which is not able to performing matching of the radio propagation channel, but only can transmit in fixed directions, may use Mode 0 even if it receives a configuration indicating Mode 1. This avoids that a second radio transceiver device 300 that estimates the direction of arrival of the received SS and ends up with a beamforming direction pointing between two first radio transceiver devices 200a, 200b. A second radio transceiver device 300 operating in a comparatively low frequency band probably does not comprise a uniform antenna array by means of which it can perform beamforming (and may hence have to use Mode 0), but a second radio transceiver device 300 with a uniform antenna array and operating in a comparatively high frequency band might estimate physical beam directions could select at least some direction for the transmission of the network access signals that would point in the direction of some of the first radio transceiver devices.

Mode 2

According to a third beamforming mode (hereinafter denoted "Mode 2") the second radio transceiver device 300 is indicated to transmit the network access signal in one narrow beam in the direction in which is receives an SS block with highest power.

Mode 2 is similar to Mode 1, but forces the second radio transceiver device 300 not to match to the channel of the received SS block, but instead to use a narrow beam. This can be useful when separate, independent detectors for receiving the network access signal are applied in each first radio transceiver device 200a, 200b, such that the second radio transceiver device 300 can focus all transmission energy of the network access signal to one such detector.

According to some aspects, PRACH configuration, including the above described message indicating which beamforming mode is to be used, is transmitted on a broadcast channel such as NR-PBCH (e.g. as part of system information). Hence, according to an embodiment the message is in step S104 transmitted on a broadcast channel.

According to other aspects, the message is in step S104 transmitted using dedicated signalling (e.g. in conjunction with switching the second radio transceiver device 300 to idle/inactive mode). Hence, according to an embodiment the message is in step S104 transmitted using dedicated signalling to the second radio transceiver device 300.

As mentioned above, it could be that the second radio transceiver device 300 is not able to use the indicated beamforming mode. Aspects relating thereto will now be disclosed.

According to some aspects, the second radio transceiver device 300 is preconfigured (or hardcoded) to always start with one mode. Hence, according to an embodiment the second radio transceiver device 300 is hardcoded to initially use one of the at least two available beamforming modes when transmitting the network access signal.

For example, the second radio transceiver device 300 could be preconfigured (or hardcoded) to always start with Mode 1. If the second radio transceiver device 300 does not detect a response to the transmitted network access signal, or the second radio transceiver device 300 is unable to operate in Mode 1 due to lack of reliable reciprocity, it could switch to another mode, e.g. Mode 0 or Mode 2. According to an embodiment the second radio transceiver device 300 is thus not enabled to use reciprocity beamforming but is configured to perform step S204b:

S204b: The second radio transceiver device 300 transmits the network access signal using beamforming in a fixed direction, or using a maximum beam width.

The second radio transceiver device 300 may further be preconfigured (or hardcoded) to always start with Mode 0, but to switch to Mode 1 or Mode 2 as a part of—or instead of—a power ramp-up procedure in absence of a response to the transmitted network access signal.

According to some aspects, the first radio transceiver device 200a instructs the second radio transceiver device 300 to use Mode 0 or Mode 1 in the first transmission of the network access signal. In the absence of a response to the network access signal, then if the second radio transceiver device 300 is using Mode 0 it could increase power, whilst if the second radio transceiver device 300 is using Mode 1 it could relax the beam used to transmit the network access signal and, optionally, also increase the power. Relaxation of the beam may refer to using a wider beam out of a set of possible predefined beam shapes. For a transmission of the network access signals that matches the radio propagation channel estimated from the received SS, the matching may treat the estimated radio propagation channel as more uncertain by superimposing multiple perturbed channel versions (i.e., multiple perturbed estimates of the radio propagation channel), or by applying minimum mean square error (MMSE) precoding principles for the transmission of the network access signals.

According to some aspects, the message indicating the beamforming mode to be used could specify ramping and then it could be up to the second radio transceiver device 300 to determine whether to realize this through increased transmit power or increased beamforming gain or a combination thereof. Particularly, according to an embodiment at least one of the at least two available beamforming modes is indicative of a power and/or beam ramp-up procedure for transmitting the network access signal. In general terms, different types of second radio transceiver devices 300 will have different beamforming capabilities and the first radio transceiver device 200a cannot assume that the second radio transceiver device 300 has certain beamforming capabilities. According to the herein disclosed embodiments, the initial transmit power, $P_0$, for the transmission of the network access signals could be provided in the system information, could be implicitly known e.g. through standard specification, could be based on estimates of path-loss, or could be explicitly associated with a reference beam gain, e.g. 0 dB. Here, the path-loss estimate could be based on measuring received power of a downlink signal, such as SS, and possibly a configurable offset. The second radio transceiver device 300 should then ensure that the combination of its transmit power and beam achieves this result. For instance, it is stipulated to use an initial transmit power of $P_0$ and the second radio transceiver device 300 uses a beam with a 2 dB beam gain, then the second radio transceiver device 300 should set the initial transmit power to $P_0-2$ dB. When ramping up the combined transmit power and beam gain (in a combination chosen by the second radio transceiver device 300), the second radio transceiver device 300 should use the same principle to adhere to the ramping configuration. The initial transmit power is typically specified in terms of parameters in an algorithm, wherein the algorithm is used to calculate an initial transmit power based on received power of a measured downlink signal.

Configuration of other aspects of the transmit power and/or beam gain could enable the freedom for the second radio transceiver device 300 to select various combinations of transmit power and beam gain for the transmission of the network access signals, but within certain ranges, e.g. in the form of transmit power or beam gain limitations. Another example is that the first radio transceiver device 200a explicitly configures the transmit power and/or the beam gain to use for the transmission of the network access signals.

It could be either mandatory or optional for the second radio transceiver device 300 to use the indicated beamforming mode. Hence, according to an embodiment the message indicates whether it is mandatory or optional for the second radio transceiver device 300 to use the indicated beamforming mode. According to some aspects, the first radio transceiver device 200a thus mandates in the message indicating the beamforming mode to be used that the second radio transceiver device 300 must use beamforming with a certain maximum beam width for the transmission of the network access signal in order to limit interference. For example, those second radio transceiver devices 300 which cannot follow this instruction (e.g., lacking beamforming capability or lacking support for directional reciprocity) would then have to regard the first radio transceiver device(s) 200a, 200b as not accessible.

One particular embodiment for configuring beamforming mode during a network access procedure of the second radio transceiver device 300 based on at least some of the above disclosed embodiments will now be disclosed in detail. Here, the functionality of the first radio transceiver devices 200a is implemented in a gNB and the functionality of the second radio transceiver device 200a is implemented in a wireless device. The gNB specifies a beamforming mode of the network access signal transmissions from the wireless device. This may be used to maximize the probability that hidden nodes are reached by the network access signal transmissions or to focus the transmit power of the network access signal transmissions in the direction of the most appropriate gNB to reduce unnecessary interference on other gNBs and wireless devices. The wireless device might use combinations of transmit power and beamforming gain (e.g. for the initial transmission of the network access signals and the ramping procedure associated with subsequent transmissions of the network access signals) and to adhere to a power related configuration of the transmission of the of the network access signals from the gNB.

Figure 7:
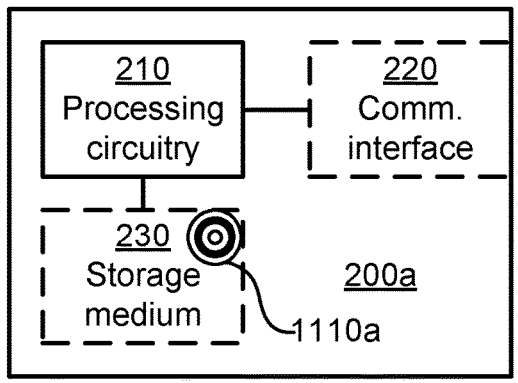
FIG. 7 is a schematic diagram showing functional units of a radio transceiver device acting as a first radio transceiver device according to an embodiment.

FIG. 7 schematically illustrates, in terms of a number of functional units, the components of a radio transceiver device 200a acting as a first radio transceiver device according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200a to perform a set of operations, or steps, S102-S108, as disclosed above. For example, the storage medium 230 may store the set of operations, and the processing circuitry 210 may be configured to retrieve the set of operations from the storage medium 230 to cause the radio transceiver device 200a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The radio transceiver device 200a may further comprise a communications interface 220 for communications at least with another radio transceiver device 200b, 300. As such the communications interface 220 may comprise one or more transmitters and receivers, comprising analogue and digital components.

The processing circuitry 210 controls the general operation of the radio transceiver device 200a e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200a are omitted in order not to obscure the concepts presented herein.

Figure 8:
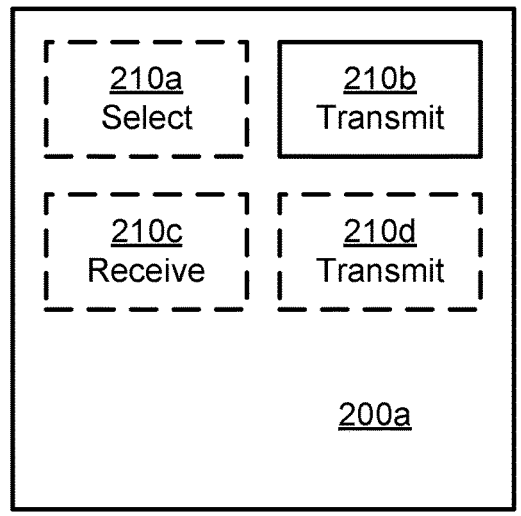
FIG. 8 is a schematic diagram showing functional modules of a radio transceiver device acting as a first radio transceiver device according to an embodiment.

FIG. 8 schematically illustrates, in terms of a number of functional modules, the components of a radio transceiver device 200a acting as a first radio transceiver device according to an embodiment. The radio transceiver device 200a of FIG. 8 comprises a transmit module 210b configured to perform step S104. The radio transceiver device 200a of FIG. 8 may further comprise a number of optional functional modules, such as any of a select module 210a configured to perform step S102, a receive module 210C configured to perform step S106, and a transmit module 210d configured to perform step S108. In general terms, each functional module 210a-210d may be implemented in hardware or in software. Preferably, one or more or all functional modules 210a-210d may be implemented by the processing circuitry 210, possibly in cooperation with functional units 220 and/or 230. The processing circuitry 210 may thus be arranged to from the storage medium 230 fetch instructions as provided by a functional module 210a-210d and to execute these instructions, thereby performing any steps of the radio transceiver device 200a as disclosed herein.

The first radio transceiver device 200a may be provided as a standalone device or as a part of at least one further device. For example, the first radio transceiver device 200a may be provided in, be part of, be collocated with, or even be a radio access network node. Hence, according to an embodiment the first radio transceiver device 200a is a radio access network node. Examples of radio access networks have been disclosed above. A first portion of the instructions performed by the first radio transceiver device 200a may be executed in a first device, and a second portion of the of the instructions performed by the first radio transceiver device 200a may be executed in a second device; the herein disclosed embodiments are not limited to any particular number of devices on which the instructions performed by the first radio transceiver device 200a may be executed. Hence, the methods according to the herein disclosed embodiments are suitable to be performed by a first radio transceiver device 200a residing in a cloud computational environment. Therefore, although a single processing circuitry 210 is illustrated in FIG. 7 the processing circuitry 210 may be distributed among a plurality of devices, or nodes. The same applies to the functional modules 210a-210d of FIG. 8 and the computer program 1120a of FIG. 11 (see below).

Figure 9:
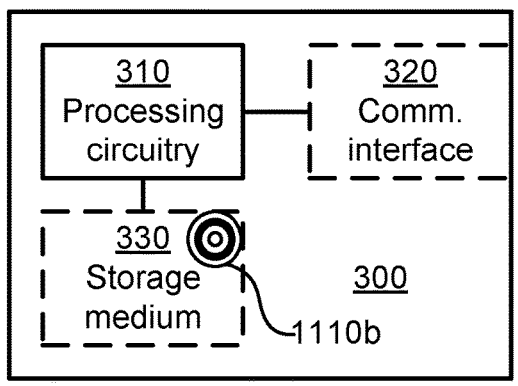
FIG. 9 is a schematic diagram showing functional units of a radio transceiver device acting as a second radio transceiver device according to an embodiment.

FIG. 9 schematically illustrates, in terms of a number of functional units, the components of a radio transceiver device 300 acting as a second radio transceiver device according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110b (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the radio transceiver device 300 to perform a set of operations, or steps, S202-S206, as disclosed above. For example, the storage medium 330 may store the set of operations, and the processing circuitry 310 may be configured to retrieve the set of operations from the storage medium 330 to cause the radio transceiver device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The radio transceiver device 300 may further comprise a communications interface 320 for communications at least with another radio transceiver device 200a, 200b. As such the communications interface 320 may comprise one or more transmitters and receivers, comprising analogue and digital components.

The processing circuitry 310 controls the general operation of the radio transceiver device 300 e.g. by sending data and control signals to the communications interface 320 and the storage medium 330, by receiving data and reports from the communications interface 320, and by retrieving data and instructions from the storage medium 330. Other components, as well as the related functionality, of the radio transceiver device 300 are omitted in order not to obscure the concepts presented herein.

Figure 10:
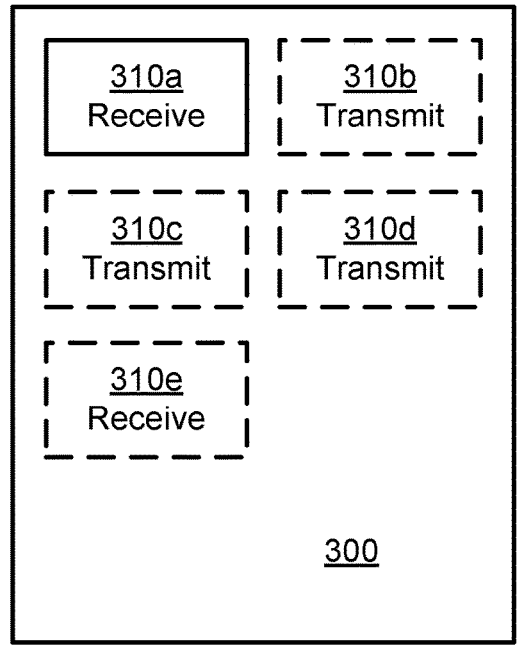
FIG. 10 is a schematic diagram showing functional modules of a radio transceiver device acting as a second radio transceiver device according to an embodiment.

FIG. 10 schematically illustrates, in terms of a number of functional modules, the components of a radio transceiver device 300 acting as a second radio transceiver device according to an embodiment. The radio transceiver device 300 of FIG. 10 comprises a receive module 310a configured to perform step S202. The radio transceiver device 300 of FIG. 10 may further comprise a number of optional functional modules, such as any of a transmit module 310b configured to perform step S204a, a transmit module 310c configured to perform step S204b, a transmit module 310d configured to perform step S204c, and a receive module 310e configured to perform step S206. In general terms, each functional module 310a-310e may be implemented in hardware or in software. Preferably, one or more or all functional modules 310a-310e may be implemented by the processing circuitry 310, possibly in cooperation with functional units 320 and/or 330. The processing circuitry 310 may thus be arranged to from the storage medium 330 fetch instructions as provided by a functional module 310a-310e and to execute these instructions, thereby performing any steps of the radio transceiver device 300 as disclosed herein.

According to an embodiment the second radio transceiver device 300 is a wireless device. Examples of wireless devices have been disclosed above.

Figure 11:
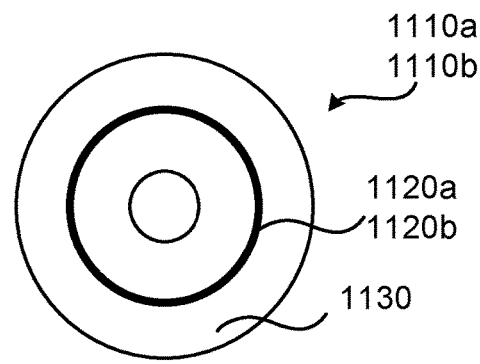
FIG. 11 shows one example of a computer program product comprising computer readable means according to an embodiment.

FIG. 11 shows one example of a computer program product 1110a, 1110b comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product lima may thus provide means for performing any steps of the first radio transceiver device 200a as herein disclosed. On this computer readable means 1130, a computer program 1120b can be stored, which computer program mob can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any steps of the second radio transceiver device 300 as herein disclosed.

In the example of FIG. 11, the computer program product 1110a, 1110b is illustrated as an optical disc, such as a CD (compact disc) or a DVD (digital versatile disc) or a Blu-Ray disc. The computer program product 1110a, 1110b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b is here schematically shown as a track on the depicted optical disk, the computer program 1120a, 1120b can be stored in any way which is suitable for the computer program product 1110a, 1110b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for configuring a beamforming mode during a network access procedure of a second radio transceiver device, the method being performed by a first radio transceiver device, the method comprising:
 selecting a beamforming mode from at least two available beamforming modes;
 transmitting toward the second radio transceiver device a message providing an indication of the selected beamforming mode, wherein
 the selected beamforming mode is to be used by the second radio transceiver device when transmitting a network access signal, and
 the provided indication of the selected beamforming mode causes the second radio transceiver device to:
  (1) transmit the network access signal using an omnidirectional beam,
  (2) transmit the network access signal using reciprocity beamforming, or
  (3) transmit the network access signal using a beam in the direction in which the second radio transceiver device received a synchronization signal with the highest power.

2. The method of claim 1, wherein
 the first radio transceiver device is a part of a communications network, and
 the beamforming mode is selected from said at least two available beamforming modes based on at least one of architecture or topology of the communications network.

3. The method of claim 1, further comprising:
 receiving in the selected beamforming mode the network access signal transmitted by the second radio transceiver device; and
 transmitting a network access response toward the second radio transceiver device in response to receiving the network access signal.

4. The method of claim 1, wherein the message is transmitted on a broadcast channel.

5. The method of claim 1, wherein the message is transmitted using dedicated signaling toward the second radio transceiver device.

6. The method of claim 3, wherein the network access response is a Random Access Response (RAR).

7. A method for configuring a beamforming mode during a network access procedure of a second radio transceiver device, the method being performed by the second radio transceiver device, the method comprising:
- receiving a message indicating which beamforming mode from at least two available beamforming modes the second radio transceiver device is to use when transmitting a network access signal, wherein the message was transmitted by the first radio transceiver device; and
- transmitting the network access signal using the indicated beamforming mode, wherein
- the indicated beamforming mode is selected by the first radio transceiver device, and
- the indicated beamforming mode causes the second radio transceiver device to:
  - (1) transmit the network access signal using an omni-directional beam,
  - (2) transmit the network access signal using reciprocity beamforming, or
  - (3) transmit the network access signal using a beam in the direction in which the second radio transceiver device received a synchronization signal with the highest power.

8. The method of claim 1, wherein
- the at least two available beamforming modes include a first beamforming mode and a second beamforming mode,
- the first beamforming mode indicates a first beam width, wherein the first beam width is a first minimum beam width or a first maximum beam width,
- the second beamforming mode indicates a second beam width, wherein the second beam width is a second minimum beam width or a second maximum beam width,
- the first beam width is greater than the second beam width.

9. The method of claim 1, wherein
- the first beamforming mode further indicates a first beam power, and
- the second beamforming mode further indicates a second beam power that is different than the first beam power.

10. The method of claim 7, wherein the first radio transceiver device is a radio access network node, and the second radio transceiver device is a wireless device.

11. The method of claim 7, wherein the second radio transceiver device is hardcoded to initially use one of the at least two available beamforming modes when transmitting the network access signal.

12. The method of claim 7, wherein each of the at least two available beamforming modes is associated with either a maximum beam width or a minimum beam width to be used for the transmission of the network access signal.

13. The method of claim 7, wherein each of the at least two available beamforming modes is associated with a unique combination of beam width and beam power to be used for the transmission of the network access signal.

14. The method of claim 7, wherein one of the at least two available beamforming modes indicates the second radio transceiver device to use reciprocity beamforming in relation to received reference signals or in relation to the received message indicating the beamforming mode.

15. The method of claim 14, wherein the second radio transceiver device is not enabled to use said reciprocity beamforming, the method further comprising:
- transmitting the network access signal using beamforming in a fixed direction, or using a maximum beam width.

16. The method of claim 7, wherein at least one of the at least two available beamforming modes is indicative of a power and/or beam ramp-up procedure for transmitting the network access signal.

17. The method of claim 7, wherein the message indicates whether it is mandatory or optional for the second radio transceiver device to use the indicated beamforming mode.

18. The method of claim 7, wherein the network access signal is a random access preamble for a Physical Random Access Channel (PRACH).

19. The method of claim 7, wherein the network access signal is used for an initial access, a handover, or a state transition from any of idle mode, inactive mode, flight mode, or dormant mode to active mode or connected mode.

20. The method of claim 19, further comprising:
- receiving a network access response transmitted by a radio transceiver device that received the network access signal, wherein the radio transceiver device that received the network access signal is the first radio transceiver device or a third radio transceiver device.

21. The method of claim 19, wherein in absence of reception of a network access response, the method further comprising:
- repeatedly transmitting the network access signal using at least one of increased beam width, modified spatial beam direction, or increased transmission power compared to the indicated beamforming mode.

22. The method of claim 21, wherein
- in a case the indicated beamforming mode is for the second radio transceiver device to use a maximum beam width, repeatedly transmitting the network access signal comprises repeatedly transmitting the network access signal using increased transmission power and using the maximum beam width, and
- in a case the indicated beamforming mode is for the second radio transceiver device to use a beam width narrower than the maximum beam width, repeatedly transmitting the network access signal comprises repeatedly transmitting the network access signal using increased beam width.

23. A first radio transceiver device for configuring a beamforming mode during a network access procedure of a second radio transceiver device, the first radio transceiver device comprising:
- processing circuitry, the processing circuitry being configured to cause the first radio transceiver device to:
- select a beamforming mode from at least two available beamforming modes, and
- transmit toward the second radio transceiver device a message providing an indication of the selected beamforming mode, wherein
- the selected beamforming mode is to be used by the second radio transceiver device when transmitting a network access signal, and
- the provided indication of the selected beamforming mode causes the second radio transceiver device to:
  - (1) transmit the network access signal using an omni-directional beam,
  - (2) transmit the network access signal using reciprocity beamforming, or
  - (3) transmit the network access signal using a beam in the direction in which the second radio transceiver device received a synchronization signal with the highest power.

24. A second radio transceiver device for configuring a beamforming mode during a network access procedure of the second radio transceiver device, the second radio transceiver device comprising:
processing circuitry, the processing circuitry being configured to cause the second radio transceiver device to:
receive a message indicating which beamforming mode from at least two available beamforming modes the second radio transceiver device is to use when transmitting a network access signal, wherein the message was transmitted by the first radio transceiver device, and
transmit the network access signal using the indicated beamforming mode, wherein
the indicated beamforming mode is selected by the first radio transceiver device, and
the indicated beamforming mode causes the second radio transceiver device to:
  (1) transmit the network access signal using an omni-directional beam,
  (2) transmit the network access signal using reciprocity beamforming, or
  (3) transmit the network access signal using a beam in the direction in which the second radio transceiver device received a synchronization signal with the highest power.

25. A second radio transceiver device for configuring a beamforming mode during a network access procedure of the second radio transceiver device, the second radio transceiver device comprising:
processing circuitry; and
a storage medium storing instructions that, when executed by the processing circuitry, cause the second radio transceiver device to:
receive a message indicating which beamforming mode from at least two available beamforming modes the second radio transceiver device is to use when transmitting a network access signal, wherein the message was transmitted by the first radio transceiver device, and
transmit the network access signal using the indicated beamforming mode, wherein
the indicated beamforming mode is selected by the first radio transceiver device, and
the indicated beamforming mode causes the second radio transceiver device to:
  (1) transmit the network access signal using an omni-directional beam,
  (2) transmit the network access signal using reciprocity beamforming, or
  (3) transmit the network access signal using a beam in the direction in which the second radio transceiver device received a synchronization signal with the highest power.

26. A first radio transceiver device for configuring a beamforming mode during a network access procedure of a second radio transceiver device, the first radio transceiver device comprising:
processing circuitry; and
a storage medium storing instructions that, when executed by the processing circuitry, cause the first radio transceiver device to:
select a beamforming mode from at least two available beamforming modes, and
transmit toward the second radio transceiver device a message providing an indication of the selected beamforming mode, wherein
the selected beamforming mode is to be used by the second radio transceiver device when transmitting a network access signal, and
the provided indication of the selected beamforming mode causes the second radio transceiver device to:
  (1) transmit the network access signal using an omni-directional beam,
  (2) transmit the network access signal using reciprocity beamforming, or
  (3) transmit the network access signal using a beam in the direction in which the second radio transceiver device received a synchronization signal with the highest power.

27. A computer program product comprising a non-transitory computer readable medium comprising a computer program for configuring a beamforming mode during a network access procedure of a second radio transceiver device, the computer program comprising computer code which, when run on processing circuitry of a first radio transceiver device, causes the first radio transceiver device to:
select a beamforming mode from at least two available beamforming modes; and
transmit toward the second radio transceiver device a message providing an indication of the selected beamforming mode, wherein
the selected beamforming mode is to be used by the second radio transceiver device when transmitting a network access signal, and
the provided indication of the selected beamforming mode causes the second radio transceiver device to:
  (1) transmit the network access signal using an omni-directional beam,
  (2) transmit the network access signal using reciprocity beamforming, or
  (3) transmit the network access signal using a beam in the direction in which the second radio transceiver device received a synchronization signal with the highest power.

28. A computer program product comprising a non-transitory computer readable medium comprising a computer program for configuring a beamforming mode during a network access procedure of a second radio transceiver device, the computer program comprising computer code which, when run on processing circuitry of the second radio transceiver device, causes the second radio transceiver device to:
receive a message indicating which beamforming mode from at least two available beamforming modes the second radio transceiver device is to use when transmitting a network access signal, wherein the message was transmitted by the first radio transceiver device; and
transmit the network access signal using the indicated beamforming mode, wherein
the indicated beamforming mode is selected by the first radio transceiver device, and
the indicated beamforming mode causes the second radio transceiver device to:
  (1) transmit the network access signal using an omni-directional beam,
  (2) transmit the network access signal using reciprocity beamforming, or
  (3) transmit the network access signal using a beam in the direction in which the second radio transceiver device received a synchronization signal with the highest power.

* * * * *